United States Patent
Bauman et al.

(10) Patent No.: US 6,854,119 B1
(45) Date of Patent: Feb. 8, 2005

(54) METHOD, APPARATUS AND ARTICLE OF MANUFACTURE FOR TRACKING PROCESSES

(75) Inventors: Mark Linus Bauman, Rochester, MN (US); Paul Richard Chmielewski, Rochester, MN (US); Christopher Thomas Gloe, Rochester, MN (US); Dawn Marie May, Mantorville, MN (US); Jay Robert Weeks, Cambridge, IA (US)

(73) Assignee: International Business Machines Corporation, Armonk, NY (US)

(*) Notice: Subject to any disclaimer, the term of this patent is extended or adjusted under 35 U.S.C. 154(b) by 727 days.

(21) Appl. No.: 09/675,698

(22) Filed: Sep. 29, 2000

(51) Int. Cl.[7] .............................................. G06F 3/00
(52) U.S. Cl. ....................................... 719/310; 719/313
(58) Field of Search .............................. 719/310, 313; 709/238, 205

(56) References Cited

U.S. PATENT DOCUMENTS

| | | | |
|---|---|---|---|
| 5,530,861 A | 6/1996 | Diamant et al. ............ 395/650 |
| 5,551,037 A * | 8/1996 | Fowler et al. ............... 719/313 |
| 5,608,893 A | 3/1997 | Slingwine et al. ........... 395/468 |
| 5,835,705 A | 11/1998 | Larsen et al. ........... 395/184.01 |
| 5,949,415 A | 9/1999 | Lin et al. ..................... 345/335 |
| 6,052,708 A | 4/2000 | Flynn et al. ................. 709/108 |
| 6,058,393 A * | 5/2000 | Meier et al. .................. 707/10 |
| 6,370,583 B1 * | 4/2002 | Fishler et al. ............... 709/238 |
| 6,470,398 B1 * | 10/2002 | Zargham et al. ............ 719/318 |

* cited by examiner

*Primary Examiner*—St. John Courtenay, III
*Assistant Examiner*—Van Hoa Nguyen
(74) *Attorney, Agent, or Firm*—Moser, Patterson & Sheridan, LLP (57) ABSTRACT

A method, apparatus and computer readable medium is provided for tracking processes using a socket object. The processes are utilized to execute an application program. Initially, a process list for the socket object is created, such that the process list contains a process identifier for a first process using the socket object. If a second process is using the socket object, the process list is updated to include the process identifier for the second process.

33 Claims, 4 Drawing Sheets

Fig. 1

```
                                                                    ┌─200
┌─────────────────────────────────────────────────────────────────┐
│              WORK WITH TCP/IP CONNECTION STATUS                 │
│                                              SYSTEM   RS043     │
│ TYPE OPTIONS, PRESS ENTER.                                      │
│ 3 = ENABLE DEBUG  4 = END  5 = DISPLAY DETAILS  6 = DISABLE DEBUG│
│ 8 = DISPLAY JOBS                                                │
│                                        ┌─202                    │
│        REMOTE         REMOTE   LOCAL                            │
│  OPT   ADDRESS        PORT     PORT     IDLE TIME   STATE       │
│   _    9.130.69.80    34266    TELNET   000:16:36   ESTABLISHED │
│   _    9.130.69.108   3032     TELNET   000:03:05   ESTABLISHED │
│   _    9.130.69.236   1069     *        005:07:15   *UDP        │
│   _    9.130.69.236   1073     *        005:07:15   *UDP        │
│   _    192.168.5.2    1031     *        005:07:15   *UDP        │
│   8    192.168.5.2    1031     5033     000:29:37   ESTABLISHED │
│                                                                 │
│ F5 = REFRESH  F11= DISPLAY BYTE COUNTS  F13 = SORT BY COLUMN    │
│ F14 = DISPLAY PORT NUMBERS   F22 = DISPLAY ENTIRE FIELD         │
│ F24 = MORE KEYS                                                 │
└─────────────────────────────────────────────────────────────────┘
```

*Fig. 2A*

```
                                                                    ┌─200
┌─────────────────────────────────────────────────────────────────┐
│              WORK WITH TCP/IP CONNECTION STATUS                 │
│                                              SYSTEM   RS043     │
│   CONNECTION TYPE . . . . . . . .   *TCP                        │
│   LOCAL ADDRESS. . . . . . . . . .  192.168.5.1                 │
│   LOCAL PORT. . . . . . . . . . . . 5033                        │
│   REMOTE ADDRESS. . . . . . . . .   192.168.5.2                 │
│   REMOTE PORT. . . . . . . . . . .  1031                        │
│                                                                 │
│  TYPE OPTIONS, PRESS ENTER.                                     │
│  5= WORK WITH JOB                                               │
│   112 ─┐        ┌─212     ┌─214    ┌─216                        │
│  ┌─────┴────────┼─────────┼────────┼──┐                         │
│  │ OPT   NAME     USER      NUMBER    │                         │
│  │  _    RS043NWS QSYS      07435  ◄─┼─ 210                     │
│  │  _    RS043NWS QSYS      07439     │                         │
│  └────────────────────────────────────┘                         │
│  F3 = EXIT  F5 = REFRESH  F6 = PRINT  F9 = COMMAND LINE         │
│  F12 = CANCEL                                                   │
└─────────────────────────────────────────────────────────────────┘
```

METHOD, APPARATUS AND ARTICLE OF MANUFACTURE FOR TRACKING PROCESSES

BACKGROUND OF THE INVENTION

1. Field of the Invention

The invention relates to providing information associated with computers. More particularly, the invention relates to a method, apparatus and article of manufacture for tracking processes.

2. Background of the Related Art

In many computer systems, particularly computer systems using multi-process or multi-threading operating systems such as the IBM AIX and the IBM OS/400, the operation of running or executing of an application program is divided into work units, commonly known as processes, jobs, tasks or threads. To perform the work of the application program, the processes use socket objects to communicate with other processes.

These processes may run on the same computer system or on different computer systems. For example, a server computer system may service the requests of many client computer systems. To service the request from a particular client computer, a process is created in the server computer. This process uses a socket object to communicate with a corresponding process at the client computer.

Information associated with the different processes and socket objects is displayed as a user interface on the display of a computer system. The current user interface programs may provide a list of active TCP/IP (Transmission Control Protocol/Internet Protocol) connections, a list of active listening local sockets or a list of work units, e.g., processes, jobs or threads. However, as computer networks include multiple server and client computer systems, a large number of processes are running on the various computer systems. Thus, there is a need to improve tracking of related processes, e.g., those processes using a common socket object for communication.

SUMMARY OF THE INVENTION

The invention provides a method, apparatus and computer readable medium for tracking processes utilized to execute an application program. In one embodiment, the method creates a process list for a socket object, such that the process list contains a process identifier for a first process using the socket object. If a second process is using the socket object, the method updates the process list to include the process identifier for the second process.

In another embodiment, the method displays a user interface containing a list of socket objects used for a computer system, and provides a process list for a socket object selected by a user from the list of socket objects. The process list contains a process identifier for the at least one process using the selected socket object.

An apparatus comprising a memory, a processor and a display device is also provided. The memory stores a user interface program. The microprocessor executes the user interface program retrieved from the memory to create and update the process list for the socket object. The process list contains a process identifier for a first process using the socket object. If a second process is using the socket object, the process list is updated to include the process identifier of the second process.

Additionally, a computer readable medium storing a software program is provided, when the software program, when executed by a processor of a computer, causes the computer to execute a method. In one embodiment of the computer readable medium, the method creates a process list for the socket object, such that the process list contains a process identifier for a first process using the socket object. If a second process is using the socket object, the method updates the process list to include the process identifier for the second process. In another embodiment of the computer readable medium, the method displays a user interface containing a list of socket objects used for a computer system, and provides a process list for a socket object selected by a user from the list of socket objects. The process list contains a process identifier for the at least one process identifier using the selected socket object.

BRIEF DESCRIPTION OF THE DRAWINGS

The teachings of the present invention can be readily understood by considering the following detailed description in conjunction with the accompanying drawings, in which.

It is to be noted, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention provide a method, apparatus and computer readable medium for tracking processes utilized to execute an application program. Initially, a process list for a socket object is created, such that the process list contains a process identifier for a first process using the socket object. If a second process is using the socket object, the process list is updated to include the process identifier for the second process.

The invention is embodied in a sockets support program utilized to create and update the process list for each socket object. Once the process list is created for a particular socket object, a user or network administrator may use a user interface program, e.g., a NETSTAT (Network Status) program, to view the process list. By viewing the process list, the user may determine whether a problem, e.g., a communications problem, exists in a process using a particular socket object coupled to another computer.

Although the following description is described in a context of tracking processes, the present invention also applies to other units of work utilized to execute an application program. For example, the present invention may similarly apply to other commonly known units of work such as jobs, tasks, threads, and the like.

Figure 1:
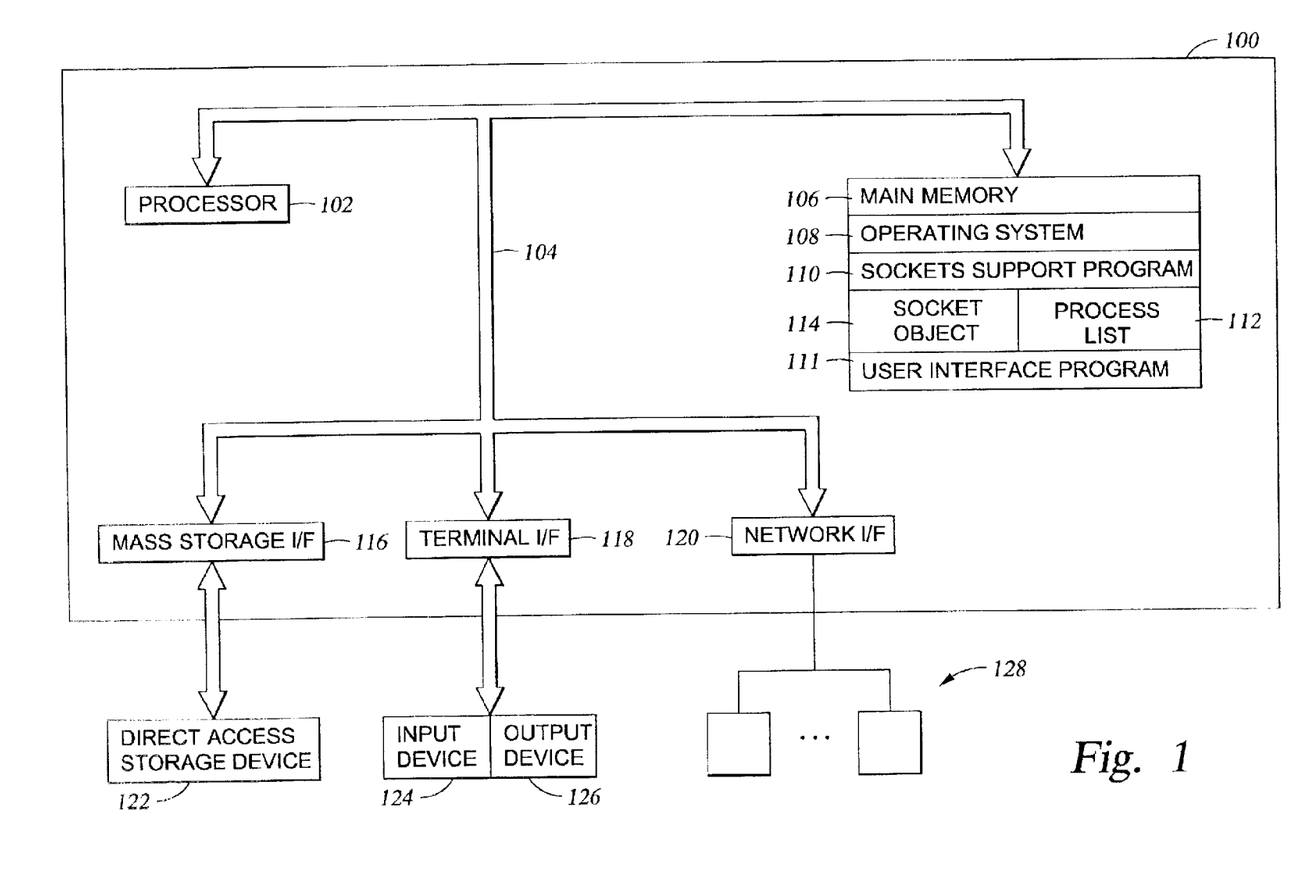
FIG. 1 depicts a block diagram of a computer system utilized to implement the present invention.

FIG. 1 depicts a computer system 100 illustratively utilized in accordance with the invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an AS/400 available from International Business Machines of Armonk, N.Y.

The computer system 100 is shown in a multi-user programming environment having at least one processor 102, which obtains instructions and from a memory 106 via a bus 104. The main memory 106 includes an operating system 108, various application programs including a sockets support program 110 and a user interface program 111, and various data structures including a process list 112 of the present invention. The main memory 106 may comprise one or a combination of memory devices, including Random Access Memory, nonvolatile or backup memory, (e.g., programmable or flash memories, read-only memories, and the like). In addition, memory 106 may include memory physically located elsewhere in a computer system, for example, any storage capacity used as virtual memory or stored on a mass storage device, or on another computer coupled to the computer system 100.

The operating system 108 is the software utilized to operate the computer system 100. More specifically, the operating system 108 performs a variety of functions including dealing with computer hardware, providing a user interface, performs user commands or program instructions and coordinates the various interfaces of the computer system 100. Additionally, the operating system 108 supports various functions in accordance with a Sockets Application Program Interface (API). Examples of such Sockets API based operating system 108 include UNIX, IBM OS/400, IBM AIX and Microsoft Windows.

To perform the various functions for the computer system 100, the operating system 108 executes a variety of applications or application programs (not shown). The operating system 108 partitions the function or operation of each application into one or more work units, commonly known as processes, jobs, tasks or threads. Each process or job comprises one or more threads. These processes may be provided from the same computer system 100 or different computer systems, e.g., server and client computers. For example, a process in a computer system may use a socket object 114 (also known as sockets) to communicate with another process in a different computer system. These computer systems may operate on different operating system platforms.

The computer system 100 is generally coupled to a number of peripheral devices. Illustratively, the computer system 100 is coupled to a direct access storage device (DASD) 122, input devices 124, output devices 126, and a plurality of networked devices 128. Each of the peripheral systems is operably coupled to the computer system 100 via respective (hardware) interfaces. A storage interface 116 couples the computer system 100 to the DASD 122. An input/output interface 118 couples the computer system 100 to the input device 124 and the output device 126.

In addition, a network interface 120 couples the computer system 100 to the plurality of networked devices 128. These networked devices 128 may comprise client computers if the computer system 100 comprises a server computer. The network interface 120 may comprise one or more network interface cards to connect server and client computers. In the case where the computer system 100 executes applications or application programs using the Sockets APL the network interface 120 is coupled to the processes via one or more socket objects 114. The processes may be from the same computer system 100 or from different computer systems.

The input device 124 may comprise any device utilized to provide input to the computer system 100. A user or a system administrator may use the input device 122 to enter a user interface command, e.g., NETSTAT (Network Status), to access the process list 112 from the memory 106. Examples of input devices 124 include a keyboard, a keypad, a light pen, a touch screen, a button, a mouse, a track ball, a speech recognition unit, and the like. The output devices 126 may comprise any conventional display screen utilized to display the process list 112 retrieved from the memory 106. Although shown separately from the input devices 124, the output devices 126 and input devices 124 could be combined. For example, a display screen with an integrated touch screen, and a display with an integrated keyboard, or a speech recognition unit combined with a text speech converter could be used.

In general, the routines executed to implement the embodiments of the invention, whether implemented as part of an operating system 108 or a specific application, component, program, object, module or sequence of instructions will be referred to herein as a sockets support program 110, or simply as the program 110. The program 110 typically comprises one or more instructions that are resident at various times in various memory and storage devices in the computer system 100. When read and executed by one or more processors 102 in the computer system 100, the program 110 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, bard disk drives, optical disks (e.g., CD-ROM, DVD, and the like), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

The sockets support program 110 tracks processes using a socket object 114 utilized to execute an application program. Initially, a process list for a socket object 114 is created, such that the process list 112 contains a process identifier for a first process using the socket object 114. If a second process is using the socket object 114, the process list 112 is updated to include the process identifier for the second process. The process list 112 for the socket object 114 is provided on the display device 126 upon executing a user interface program 111.

Figure 2A:
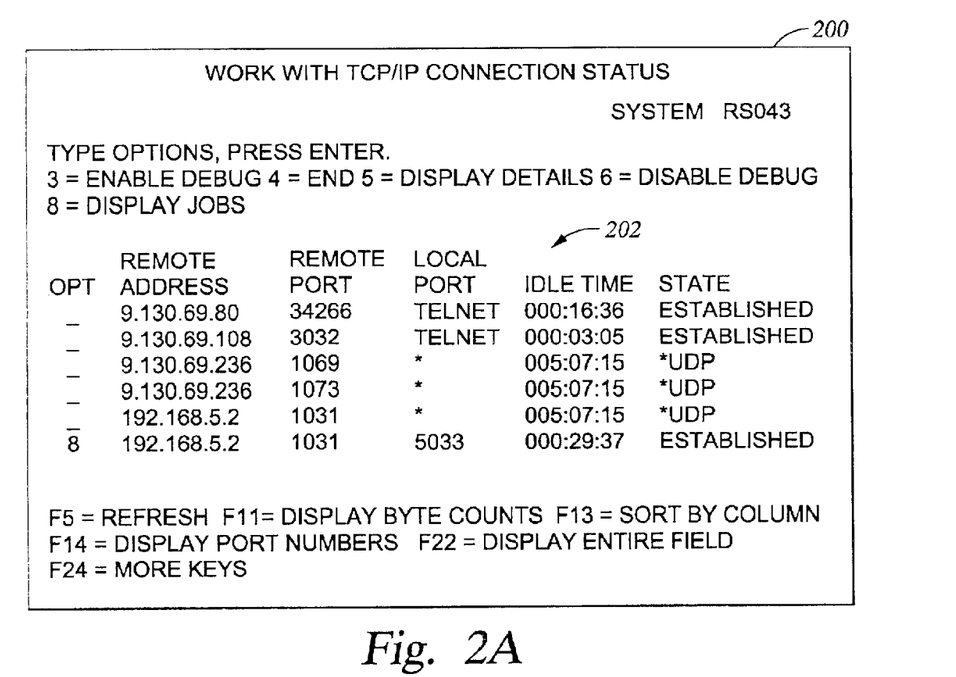
FIG. 2A depicts an exemplary user interface utilized to display a process list of the present invention.

FIG. 2A depicts an exemplary user interface 200 utilized to display the process list 112 of the present invention. The user interface 200 is displayed on the output device 126. A computer system 100 provides the user interface 200 upon running the user interface program 111, e.g., NETSTAT, in response an input command via the input device 124. The user interface 200 illustratively displays a list 202 of client computers communicating with the socket objects 114 at the server computer 100.

Each row in the list 202 of client computers comprises information for a socket object or local port at the server computer system 100. For each socket object 114, the list 202 provides the remote (client) Internet Protocol (IP) address, the remote port number of the client computer, and the local port used by the socket object 114. The list 202 also provides the state of communication between the server computer 100 and the client computers. This state of communication depends on the communications protocol between the server computer and client computers. Examples of the protocol include the Transmission Control Protocol (TCP) for connection-orientated communication and the User Datagram Protocol (UDP) for connectionless communication.

Figure 2B:
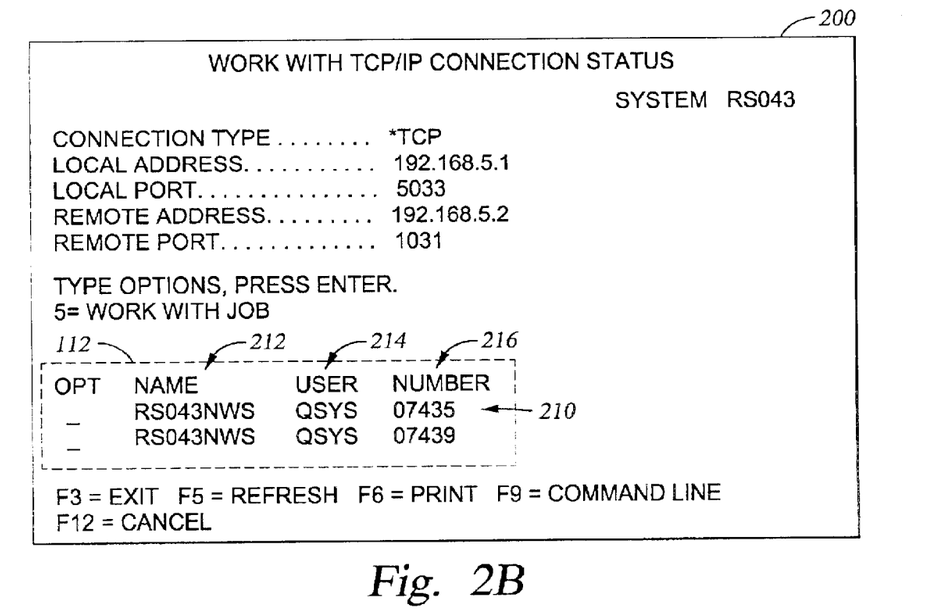
FIG. 2B depicts the process list for a socket object selected from the user interface of FIG. 2A.

A user or network administrator may use an option, e.g., 8=Display jobs, at the user interface 200 to display the process list 112 for a particular port used by the socket object 114. FIG. 2B depicts such an exemplary process list 112 containing a list of process identifiers of active processes using a particular socket object 114 selected from the process list 202 depicted in FIG. 2A. Each row of the process list 112 contains a unique process identifier 210 for a particular process. The process identifier 210 may comprise a process name 212 or job name, a user 214, e.g., a client, associated with the process name, and a process number 216 or job number. The process identifier 210, as represented by the combination of elements 212–216, is generally unique for a particular process. In one embodiment, the process number identifier 210 comprises a unique process number 216, e.g., 07435 or 07439.

Although the illustrative process list 112 shows only two active processes, the process list 112 may be configured to show all active processes using a particular socket object 114. As such, the user or network administrator may use the user interface 200 to determine the whether a problem, e.g., a communications problem is associated with a process for a particular client computer. For example, if the user suspects a problem with a client at IP address 192.168.5.2, the user may enter option "8" at the entry for the socket object 114.

Although FIGS. 2A–2B described the user interface 200 in terms of a server computer linked to a plurality of client computers, the present invention is not so limited. For example, the GUI 200 may also be provided for a client computer linked to a plurality of server computers, or a stand-alone client computer or a stand-alone server computer. Additionally, the process list 112 may also be displayed on a graphic user interface (GUI).

Figure 3:
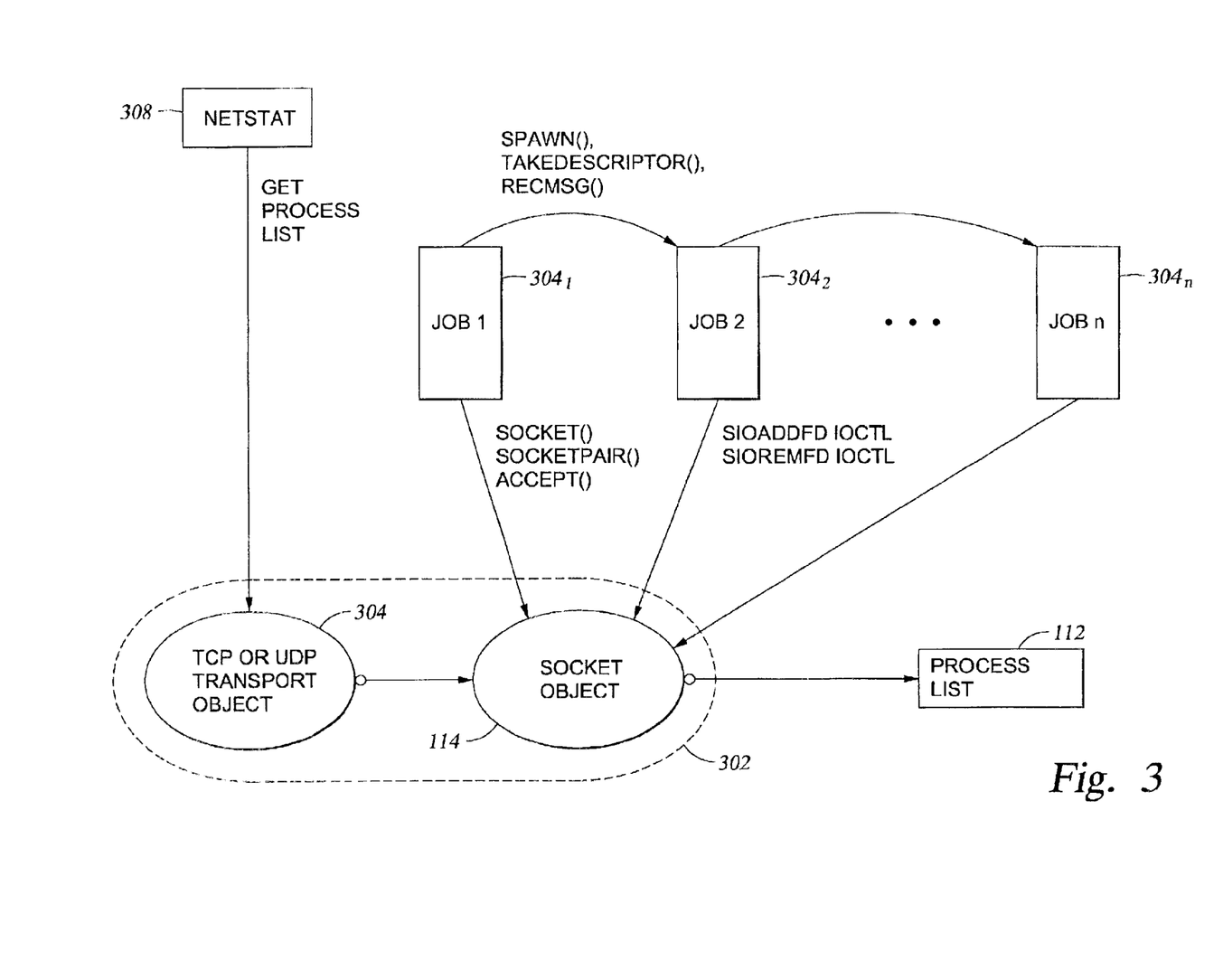
FIG. 3 depicts a software process diagram for creating and updating the process list of the present invention.

FIG. 3 depicts a software process diagram for creating and updating the process list 112 of the present invention. Specifically, the software process diagram illustrates an endpoint object 302 and associated processes jobs) $304_1$, $304_2$, . . . $304_n$ utilized to create and update the process list 112. Although one endpoint object 302 is illustratively shown in the software process diagram, the invention applies to each active endpoint object 302 created by the operating system 108.

The endpoint object 302 illustratively comprises a socket object 114 and a transport object 306. The socket object 114 is created by the operating system 108 in response to a socket ( ), socketpair ( ) or accept ( ) function within a first process or job $304_1$. The socket ( ) function initiates the creation of the socket object 114. The socketpair ( ) function initiates the creation of a pair of socket objects 114. The accept ( ) function waits for an incoming connection from a client computer and ties the incoming connection to the socket object 114 for an application program.

The transport object 306 operates as an interface to the endpoint object 302 of another computer. The transport object 306 may comprise a TCP transport object to implement connection-orientated communication or a UDP transport object to implement connectionless communication. The creation of the transport object 306 depends on an address parameter in the socket ( ) and socketpair ( ) functions. If the address parameter or address field is AF_INET, a transport object 306 is created with socket object 114. The AF_INET address typically comprises a 32-bit or 128-bit Internet Protocol (IP) address for identifying a computer system 100 on a global network, e.g., the Internet. If the address parameter is AF_UNIX, only the socket object 114 is created in response to the socket ( ) or socketpair ( ) functions, i.e., no transport object 306 is required or created. The AF_UNIX address is utilized by the operating system 108 to communicate between two processes on the same computer system 100.

The socket object 114 is accessed or utilized by an application program using a Sockets Application Program Interface (Sockets API). Namely, the socket object 114 allows an application program to interface with the transport or network layers of the TCP/IP model or other network support models, e.g., AF_UNIX. A process list 112 of the present invention is provided for the socket object 114. In one embodiment, the process list 112 contains a list of all the active processes using the socket object 114. However, the process list 112 may also be configured to contain a list of all processes using the socket object 114 during a predefined time interval.

The processes are related such that a first job $304_1$ references a second job $304_2$, which then references a third job (not shown), and continues up to the n-th job $304_n$. The processes or jobs may run on the same computer system 100 or on different computer systems. For example, if the socket object 114 was created using a AF_UNIX address, the jobs may run on the same computer system 100. If the socket object 114 was created using a AF_INIT address, the jobs may run on different computer systems 100, i.e., a server computer and a client computer.

Initially, a socket ( ), socketpair ( ) or accept ( ) function in the first job 304, causes the operating system 108 to create the socket object 114. If the socket object 114 was created using an AF_INET address, the operating system 108 also creates the transport object 306. A process list 112 or job list is created for the socket object 114. As the process list 112 or job list contains the active processes using the socket object 114, the first entry in the process list 112 is the process issuing the socket ( ), socketpair ( ) or accept ( ) function utilized to create the socket object 114. A socket descriptor is also created for the socket object 114. The socket descriptor is an identifier or handle utilized for identifying the socket object 114 such that other processes may also use the socket object 114.

To enable a second job $304_2$ to utilize the socket object 114, the first job $304_1$, passes the socket descriptor to the second job $304_2$ by issuing a spawn ( ), senddescriptor ( ) or sendmsg ( ) function. The spawn ( ) function creates the second job 304₂ and passes the socket descriptor to the second job 304₂. The senddescriptor ( ) function passes the access rights to the socket descriptor to the second job 304₂, which then issues a takedescriptor ( ) function to receive the access rights to the socket descriptor. The sendmsg ( ) function sends the socket descriptor to the second job 304₂, which issues a recvmsg ( ) function to the socket descriptor.

Once the socket descriptor is received by the second job 304₂, the function used to receive the socket descriptor issues an input/output control command, e.g., SIOADDFD IOCTL, to the socket object 114. In response to the SIO-ADDFD IOCTL function, the second job 304₂ is added to the process list 112 for the socket object 114. If the socket descriptor is passed to additional processes within a sequence of n processes or jobs 304₁, 304₂, . . . 304ₙ, using the socket object 114, these processes 304₁, 304₂, . . . 304ₙ, are also added to the process list 112. Once a process expires or no longer utilizes the socket object 114, another input/output control command, a SIOREMFD IOCTL command is issued to the socket object 114, which causes the job to be removed from the process list 112.

In accordance to the present invention, the process list 112 for the socket object 114 is provided on the display 126 of a computer system 100. A user, e.g., a system or network administrator, may use a user interface program 110, e.g., a NETSTAT application 308, to display the process list 112 using a particular socket object. Namely, one embodiment of the present invention may provide the process list 112 as an option in the NETSTAT application 308. For example, the network administrator may use a GetProcessList command to select an endpoint object 302 (containing the socket object 114) to view the process list 112 for the selected endpoint object 302 or socket object 114. To view all processes associated with a remote client computer, the administrator may select all the endpoint objects 302 for the particular client computer and obtain the process list 112 for each selected endpoint object 302 or socket object 114 as shown in FIG. 2B.

Figure 4:
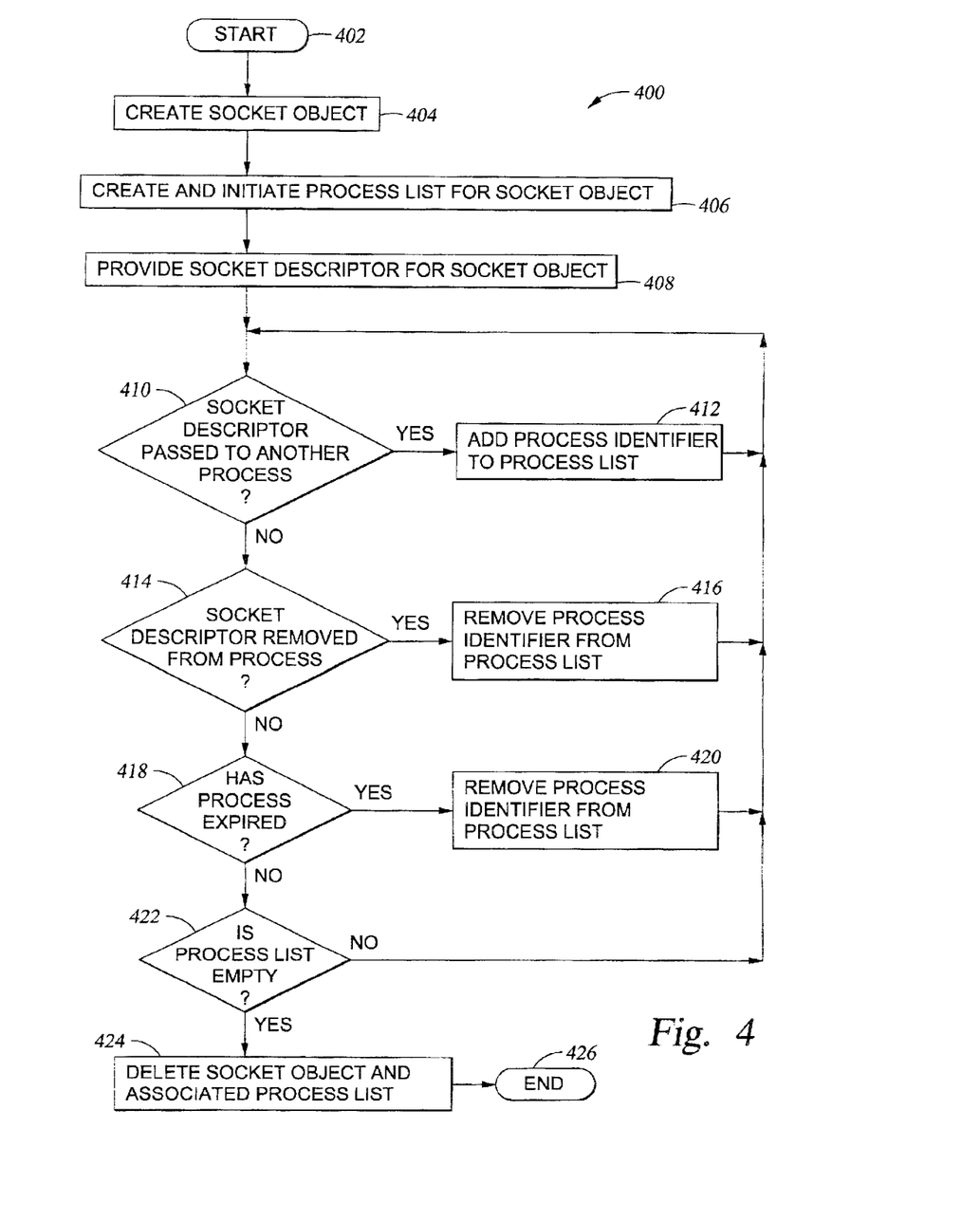
FIG. 4 depicts a flow diagram of a method for implementing the process list of the present invention To facilitate understanding, identical reference numerals have been used, where possible, to designate identical elements that are common to the figures.

FIG. 4 depicts a flow diagram of a method 400 for implementing the process list 112. Although the method 400 is described in terms of a single socket object 114, the method 400 also applies to other socket objects 114. Specifically, the method 400 starts at step 402 and proceeds to step 404, where the socket object 114 is created by the operating system 108. The creation of the socket object 114 occurs in response to a process initiating the use of the socket object 114 for an application program. Namely, the process issues a socket ( ), socketpair ( ) or accept ( ) function to create the socket object 114.

At step 406, the method 400 creates and initializes a process list 112 for the socket object 114. In one embodiment, the process list 112 contains the process identifier a list of active processes using the socket object 114. Initially, the process list 112 contains the process identifier of the process containing the function utilized to create the socket object 114. The method 400 proceeds to step 408, where a socket descriptor is assigned or provided for the socket object 114. The socket descriptor operates as an identifier or handle for all processes actively using the socket object 114.

The method 400 proceeds to step 410, where a query determines whether the socket descriptor is passed to another process, e.g., a second process or job. A socket descriptor is passed to another process when multiple processes are desired for a particular socket. To receive the socket descriptor, the other process may issue a takedescriptor ( ) function in response to a senddescriptor ( ) function issued by an active process using the socket object, or issue a recvmsg ( ) function in response to a sendmsg ( ) function issued by an active process using the socket object 114. The other process may also receive the socket descriptor if the process is created in response to a spawn ( ) function issued by an active process using the socket object 114. In any case, upon receipt of the socket descriptor by the other process, the function used to receive the socket descriptor issues an input/output control command, e.g., SIOADDFD IOCTL, to the socket object 114. Thus, step 410 determines whether the socket object 114 has received a SIOADDFD IOCTL command in response to a function utilized to pass a socket descriptor to another process. If the socket descriptor is passed to another process, the method 400 proceeds to step 412, where the process identifier 210 for the process receiving the socket descriptor is added to the process list 112. After adding the process identifier 210 to the process list 112, the method 400 returns to step 410. If the socket descriptor is not passed to another process, the method 400 proceeds to step 414, where a query determines whether the socket descriptor is removed from a process using the socket object 114. For example, when a process no longer requires the use of the socket object 114, the process may issue a close ( ) function. Once the close ( ) function is issued from the process, the close ( ) function causes the removal of the socket descriptor from the process issuing the close ( ) function, and issues an input/output control command, e.g., a SIOREMFD IOCTL command, to the socket object 114. Thus, step 414 determines whether the socket object 114 has received a SIOREMFD IOCTL command in response to the close ( ) function issued by a process. If the socket descriptor is removed from the process, the method 400 proceeds to remove the associated process identifier 210 from the process list 112 at step 416 and returns to step 410. If the socket descriptor is not removed from the process, the method 400 proceeds to step 418, where a query determines whether a process using the socket object 114 has expired. If the process has expired, the method 400 proceeds to step 420, where the process identifier 210 for the expired process is removed from the process list 112. After removing the process identifier 210 from the process list 112, the method 400 returns to step 410. An input/output control command, e.g., SIMREMFD IOCTL is transmitted to the socket object when the process expires. If the process has not expired, the method 400 proceeds to step 422, where a query determines whether the process list 112 is empty, i.e., no longer contains any processes. If the process list is not empty, the method 400 returns to step 410. If the process list is empty, i.e., when the last process 304ₙ using the socket expires or issues the close ( ) function, the method 400 proceeds to step 424, where the socket object 114 and associated process list 112 are deleted. The method 400 ends at step 426.

While the foregoing is directed to the preferred embodiment of the present invention, other and further embodiments of the invention may be devised without departing from the basic scope thereof, and the scope thereof is determined by the claims that follow.

What is claimed is:

1. A method for tracking at least one process using a socket object, where the at least one process is utilized to execute an application program, the method comprising:

creating a process list for the socket object, where the process list contains a process identifier for a first process using the socket object;

updating, if a second process is using the socket object, the process list to include the process identifier for the second process; and determining, by the socket object, if the process list is empty and if the process list is empty, deleting the socket object.

2. The method of claim 1 wherein the process list is displayed on a user interface in response to a user interface command entered by a user.

3. The method of claim 1 wherein the step of updating comprises:
adding the process identifier of the second process to the process list if the second process is to use the socket object.

4. The method of claim 3 wherein the second process is to use the socket object if a socket descriptor created for the socket object is passed from the first process to the second process.

5. The method of claim 1 wherein the step of updating comprises:
removing the process identifier of at least one of the first process and second process from the process list if the at least one of the first process and second process no longer uses the socket object.

6. The method of claim 5 wherein the at least one of the first process and second process no longer uses the socket object if a socket descriptor created for the socket object is removed from the at least one of the first process and second process.

7. The method of claim 1 wherein the step of updating comprises:
removing the process identifier of at least one of the first process and the second process from the process list if the at least one of the first process and second process expires.

8. The method of claim 1 wherein the first process comprises a Sockets Application Program Interface (API) function utilized to create the socket object.

9. The method of claim 8 wherein the Sockets API function comprises one of a socket (function, a socketpair ( ) function and an accept ( ) function.

10. The method of claim 1 wherein the creating and updating are performed by an operating system after a computer executes a sockets support program.

11. The method of claim 1 wherein the first process and the second process are provided in the same computer system.

12. The method of claim 1 wherein the first process and the second process are provided in different computer systems.

13. The method of claim 1 wherein the process identifier comprises at least one of a process name, a user name associated with the process name and a process number.

14. An apparatus for tracking at least one process of an application program using a socket object, the apparatus comprising:
a memory for storing an operating system and a sockets support program; and
a processor, coupled to the memory, for performing a method upon executing the sockets support program retrieved from the memory, the method comprising:
creating a process list for a socket object, where the process list contains a process identifier for a first process using the socket object, an
updating, if a second process is using the socket object, the process list to include the process identifier of the second process, and
determining, by the socket object, if the process list is empty, and if the process list is empty, deleting the socket object.

15. The apparatus of claim 14 further comprising:
a network interface for coupling the socket object with a remote device.

16. The apparatus of claim 14 further comprising:
a display device, coupled to the processor, for displaying the process list when the processor retrieves and executes a user interface program from the memory.

17. The apparatus of claim 14 wherein the operating system comprises one of UNIX, IBM AIX, IBM OS/400 and Microsoft Windows.

18. The apparatus of claim 14 wherein the network interface couples the first process to the second process.

19. A computer readable medium storing a software program that, when executed by a processor of a computer, causes the computer to perform a method comprising:
creating a process list for a socket object, where the process list contains a process identifier for a first process using the socket object: ed
updating, if the second process is using the socket object, the process list to include the process identifier of the second process, and
determining by the socket object, if the process list is empty, and if the process list is empty, deleting the socket object.

20. The computer readable medium of claim 19 wherein the process list is displayed on a user interface in response to a user interface command entered by a user.

21. The computer readable medium of claim 19 wherein the step of updating comprises:
adding the process identifier of the second process to the process list if the second process is to use the socket object.

22. The computer readable medium of claim 21 wherein the second process is to use the socket object if a socket descriptor created for the socket object is passed from the first process to the second process.

23. The computer readable medium of claim 19 wherein the step of updating comprises:
removing the process identifier of at least one of the first process and second process from the process list if the at least one of the first process and second process no longer uses the socket object.

24. The computer readable medium of claim 23 wherein the at least one of the first process and second process no longer uses the socket object if a socket descriptor created for the socket object is removed from the at least one of the first process and second process.

25. The computer readable medium of claim 19 wherein the step of updating comprises:
removing the process identifier of at least one of the first process and the second process from the process list if the at least one of the first process and second process expires.

26. The computer readable medium of claim 19 wherein the first process comprises a Sockets Application Program Interface (API) function utilized to create the socket object.

27. The computer readable medium of claim 26 wherein the Sockets API function comprises one of a socket ( ) function, a socketpair ( ) function and an accept ( ) function.

28. The computer readable medium of claim 19 wherein the creating and updating are performed by an operating system after a computer executes a sockets support program.

29. The computer readable medium of claim 19 wherein the first process and the second process are provided in the same computer system.

30. The computer readable medium of claim 19 wherein the first process and the second process are provided in different computer systems.

31. The computer readable medium of claim 19 wherein the process identifier comprises at least one of a process name, a user name associated with the process name and a process number.

32. A method for tracking at least one process using a socket object, the method comprising:

creating a process list for the socket object, where the process list contains a press identifier for a first process using the socket object;

providing a socket descriptor for the socket object;

adding a second process identifier for a second process to the process list if the socket descriptor is passed to the second process;

determining if the socket descriptor passed to the second process has been removed from the second process, and if so removing the second process identifier for the second process from the process list;

determining if the second process has expired, and if so removing the second process identifier for the second process from the process list; and determining, by the socket object, if the process list is empty, and if the process list is empty, deleting the socket object.

33. The method of claim 1 wherein the determination of whether the process list is empty and the deletion of the socket object is performed by the socket object.

\* \* \* \* \*

UNITED STATES PATENT AND TRADEMARK OFFICE
CERTIFICATE OF CORRECTION

PATENT NO. : 6,854,119 B1  Page 1 of 1
DATED : February 8, 2005
INVENTOR(S) : Mark Linus Bauman et al.

It is certified that error appears in the above-identified patent and that said Letters Patent is hereby corrected as shown below:

Column 9,
Line 37, "(" should be -- ( ) --.
Line 61, delete "an".

Column 10,
Line 18, delete "ed".

Signed and Sealed this

Seventeenth Day of May, 2005

JON W. DUDAS
*Director of the United States Patent and Trademark Office*